W. E. GRIFFIN.
NUT LOCK.
APPLICATION FILED JULY 17, 1917.

1,260,188.

Patented Mar. 19, 1918.
2 SHEETS—SHEET 1.

WITNESS
A. H. Rylrand

INVENTOR
W. E. Griffin
BY Victor J. Evans
ATTORNEY

W. E. GRIFFIN.
NUT LOCK.
APPLICATION FILED JULY 17, 1917.
1,260,188.
Patented Mar. 19, 1918.
2 SHEETS—SHEET 2.
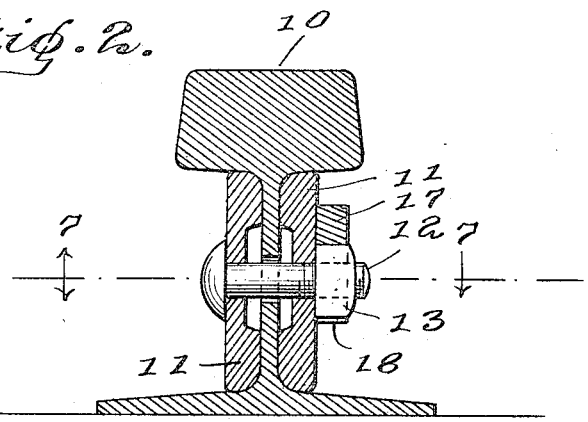
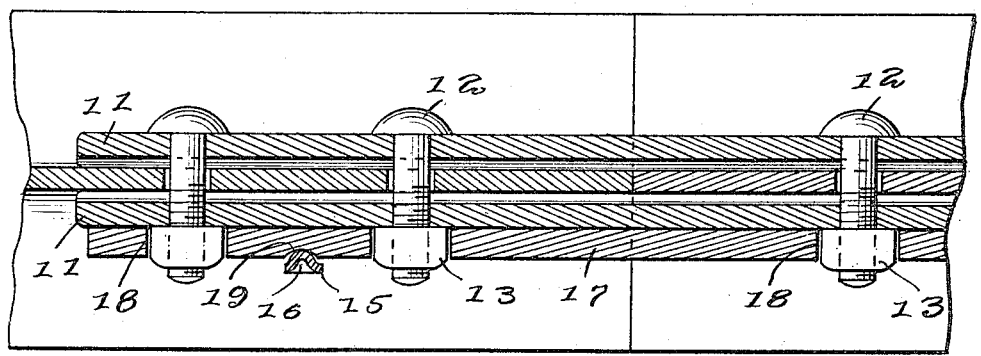
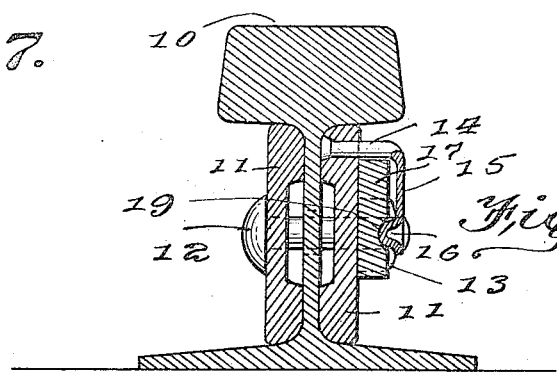
WITNESS
INVENTOR
W. E. Griffin
BY Victor J. Evans
ATTORNEY

UNITED STATES PATENT OFFICE.

WILLIAM E. GRIFFIN, OF BEATRICE, NEBRASKA.

NUT-LOCK.

1,260,188. Specification of Letters Patent. Patented Mar. 19, 1918.

Application filed July 17, 1917. Serial No. 181,146.

*To all whom it may concern:*

Be it known that I, WILLIAM E. GRIFFIN, a citizen of the United States, residing at Beatrice, in the county of Gage and State of Nebraska, have invented new and useful Improvements in Nut-Locks, of which the following is a specification.

This invention relates to improvements in nut locks, and has for its object to effectively retain the nuts employed in connecting two members, such as the meeting ends of two railway rails against accidental turning in an unscrewing direction.

In carrying out my invention, it is my purpose to provide a plate, such as a fish plate for a rail joint, with turnable members, to arrange upon the fish plate a notch plate, the notches of which receiving the securing nuts for the connecting bolts between the plate and rails, the said turnable members engaging with the last mentioned plate to hold the same upon the fish plate and in proper engagement with the nuts.

Other objects and advantages will appear as the nature of the invention, is more fully understood, reference being had to the accompanying drawings, in which, Figure 1 is a perspective view illustrating the application of the improvement.

Fig. 2 is a sectional view approximately on the line 2—2 of Fig. 1.

Fig. 5 is a sectional view approximately on the line 5—5 of Fig. 1.

Figure 1:
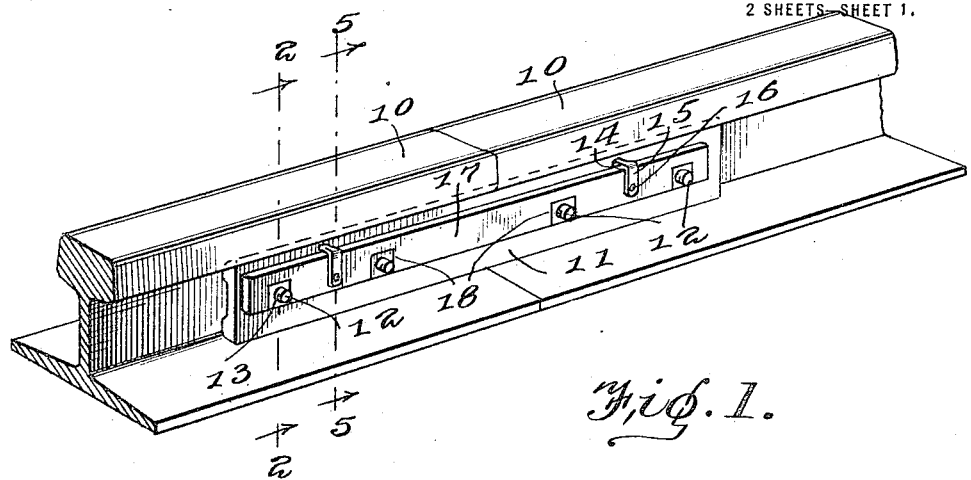
Figure 3:
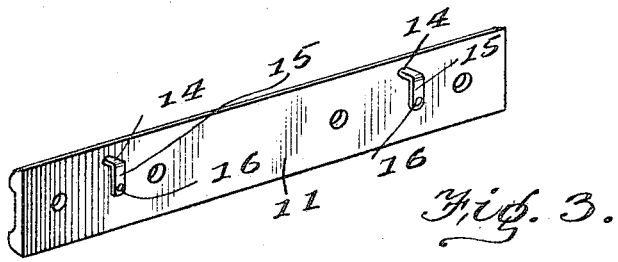
Fig. 3 is a perspective view of the fish plate.
Figure 6:
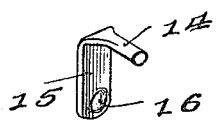
Fig. 6 is a perspective view of one of the spring plate engaging elements removed from the fish plate.
Figure 4:
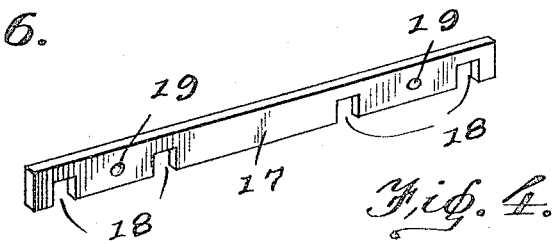
Fig. 4 is a perspective view of the nut engaging plate.

Referring now to the drawings in detail, the numerals 10—10 designate the abutting ends of two railway rails, 11 the fish plates arranged in the fish spaces to the opposite sides of the rails, 12 the bolts passing through alining openings in the webs of the rails and fish plates, and 13 the securing nuts for the bolts.

One of the fish plates has pivotally connected therewith, the horizontal arm 14 of a latching member 15, the said latch member being preferably provided, upon its inner face, with an inturned lug 16. The offset arm of the latching member, that is the arm provided with the lug 16 is designed to exert a spring tension in the direction of the fish plate to which it is secured, and therefore, the outer end of the said arm, from the inner face thereof, may be inclined to the corner of the arm, for a reason which will presently be apparent.

The numeral 17 designates a flat plate which has one of its edges notched, as at 18, to receive therein, the bolts 13. This plate 17, upon its outer face, at a suitable spaced distance from its ends is provided with depressions 19 arranged whereby to receive the lugs upon the outer arms of the turnable members 15, when the same are rotated over the outer face of the plate 17, after the said plate has been brought to engaging position with the nuts.

By reference to the drawings it will be noted that the latching members 15 are arranged on the plate 11 near the upper edge thereof, so that the horizontal portions 14 of the said members 15 will overlie and contact with the upper edge of the plate 17. This arrangement, it will be noted, will positively hold the plate 17 against upward movement, the longitudinal and downward movement of the plate being prevented by the engagement of the nuts in the notches 18 of the said plate 17. It will be further noted by reference to the drawings, that the lugs 16 are formed by indenting the outer ends of the vertical arms of the members 15, so that the lugs are in the nature of hollow rounded bosses which necessarily embody a greater amount of resiliency than would be true were the lugs solid, or in other words the lugs 16, when received in the depressions 19 in the plate 17 will expand themselves to tightly engage with the walls provided by the said depressions so that the said lugs, in their engagement with the depressions do not entirely depend on the spring vertical arm of the members 15.

Having thus described the invention, what I claim is:

In a nut locking means, the combination with a structure connected by bolts and nuts, of a plate arranged against one of the sides of the structure and having openings through which the bolts pass, said plate, adjacent its upper edge and near its nuts having right angular spring catch members pivotally connected thereto, the outer arms of the said members exerting a tension toward the plate, and said arms, adjacent their outer ends having their outer face depressed to provide inwardly projecting lugs, a nut engaging plate having its lower edge notched and arranged against the first mentioned plate and having the nuts received in the notches of the second mentioned plate, said second mentioned plate having depressions upon its outer face which are designed to receive the hollow lugs of the outer arms of the catch members, when the said catch members are swung over the second mentioned plate and the other arms thereof are brought to engage with the upper edge of the second mentioned plate.

In testimony whereof I affix my signature.

WILLIAM E. GRIFFIN.

Copies of this patent may be obtained for five cents each, by addressing the "Commissioner of Patents, Washington, D. C."